Jan. 4, 1944.     W. C. LORENZEN     2,338,592
CAN PUNCH
Filed April 13, 1942
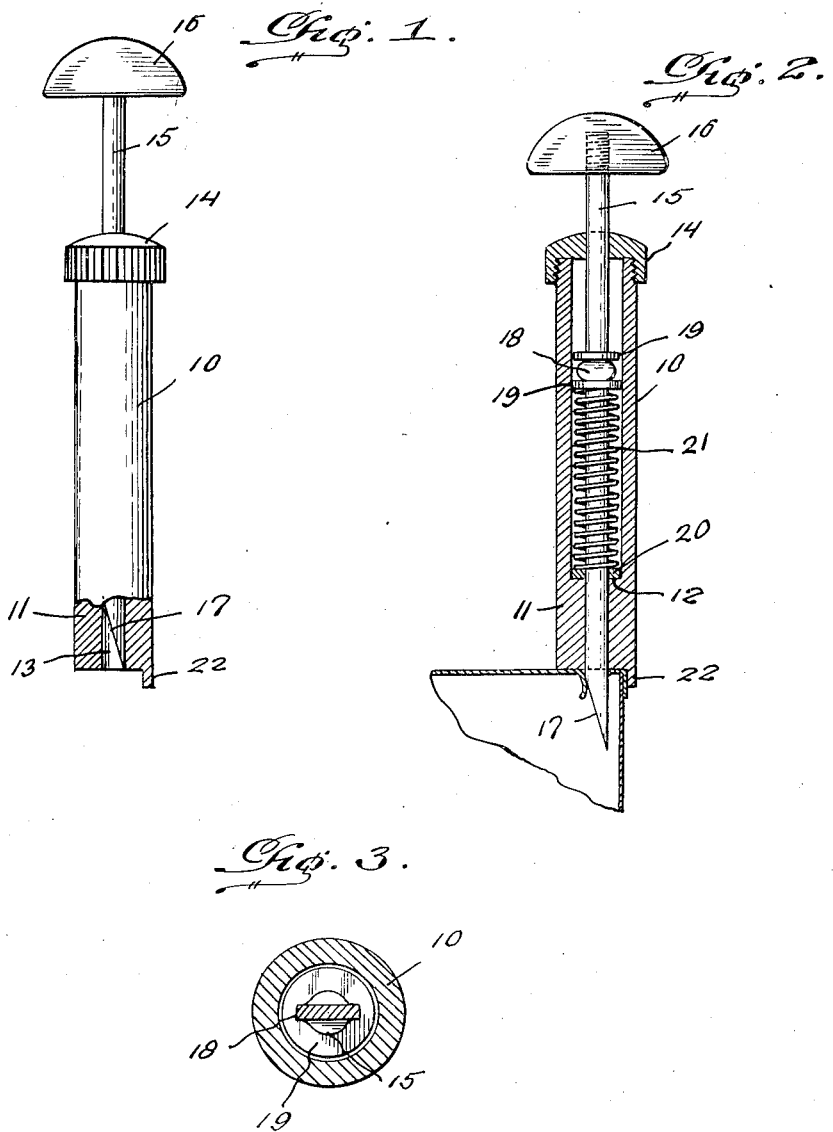
Inventor
Walter C. Lorenzen,
By Edward H. Geoger
Attorney Patented Jan. 4, 1944

2,338,592

UNITED STATES PATENT OFFICE 2,338,592

CAN PUNCH

Walter C. Lorenzen, Holland, Ohio

Application April 13, 1942, Serial No. 438,821

1 Claim. (Cl. 30—16)

The present invention relates to a can punch primarily intended for perforating evaporated or condensed milk cans, although its general use with other types of cans is contemplated by the claim.

The invention has for one of its principal objects the provision of a can punch constructed to permit of its use with a minimum of effort, and one which cuts the metal rather than pierce the same, thereby providing the top of the can with a comparatively small neat hole or perforation.

In carrying out the invention I employ a spring influenced plunger operating within a casing and having a beveled cutting element normally housed within the casing, and disposed to immediately penetrate the top of the can without any lost motion incident to a slight downward movement of the plunger.

One of the chief characteristics of the invention resides in the provision of a device of the class mentioned, which can be used with utmost safety, in that, should the device slip off the can being perforated, the plunger carried cutting element immediately disappears within the casing.

It is a primary object of the invention to construct the device so that it can be manufactured and marketed at a very nominal cost, its simplicity and ease with which it can be used being outstanding characteristics of the invention.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view in elevation and partly in section of the device forming the subject matter of the invention.

Figure 2 is a vertical sectional view through the device showing it in use.

Figure 3 is a transverse sectional view through the device.

Before entering into a detail description of what is herein illustrated, I desire to have it known that while the invention is primarily intended for perforating the tops of evaporated or condensed milk cans or the like, its general application or use with all other type of cans is contemplated by the claim.

The invention essentially embodies a casing 10 of cylindrical contour in cross section and open at both ends. The casing may of course be constructed from any suitable material and also vary in size without departing from the spirit of the invention. The casing 10 includes a relatively thick lower end portion 11 defining an internal shoulder 12 and also provides the casing with a restricted bore 13 opening at the lower end of the casing as shown. The upper end of the casing is normally closed by a removable cap 14 which may be associated with the casing in any suitable manner, being preferably threaded thereon as illustrated. The cap 14 is provided with a central opening through which operates a spring influenced plunger 15 equipped with a suitable knob or head 16.

The plunger 15 operates through the casing 10 and is provided with a beveled cutting element at its lower end. This cutting element may of course be separated from the plunger, and connected with the latter in any suitable manner, although this cutting element is preferably formed by beveling the lower extremity of the plunger as indicated at 17. The cutting element is designed to cut the metal top of the can with a shearing action, rather than pierce the same, and thus provide the can with a comparatively small neat opening or perforation of approximately one-fourth of an inch adjacent the edge of the can. The plunger 15 at an appropriate point in its length is slightly flared as at 18, and above and below which are mounted washers 19. Surrounding the plunger 15, and interposed between one of the washers 19 and a similar washer 20 reposing upon the shoulder 12, is a coil spring 21 tensioned to normally hold the cutting element 17 wholly within the bore 13 of the casing 10.

In this connection it is important to note that in the normal position of the plunger, the cutting element 17 lies substantially flush with the lower end of the casing 10, so that it will immediately penetrate the top of the can incident to a slight downward movement of the plunger. In other words, the device can be used with a minimum of effort as there is no lost motion of the plunger, and only a slight amount of pressure is necessary to actuate the plunger for the purpose intended. Depending from the lower end of the casing 10 is a lip 22 arranged to engage the side of the can with the casing 10 reposing upon the top of the can as illustrated in Figure 2. By virtue of this construction the device can be quickly positioned upon the can to perforate the top thereof immediately adjacent the edge of the can. As hereinabove stated the device can be used with absolute safety, because, should the device slip off the can the plunger carried cutting element quickly moves to its normal position wholly within the bore 13 of the casing.

While it is believed that the nature and advantages of the invention will be readily understood from the foregoing description, I desire to have it known that I do not limit myself to what is herein illustrated or described, and that such changes in construction as desired may be resorted to which fall within the scope of the claim.

What is claimed is:

In a device of the character described, a casing of cylindrical contour in cross section open at both ends, an apertured cap removably associated with the upper end of the casing, an internal shoulder in the length of the casing, a washer reposing on said shoulder, a plunger rod operating through the cap and casing and having a flared portion, washers on said plunger rod above and below the flared portion thereof, a beveled cutting element on the lower end of the plunger, and a coil spring surrounding said rod and interposed between said shoulder and one of the washers on the rod, and normally maintaining the plunger rod elevated and the cutting element housed within the casing.

WALTER C. LORENZEN.